US011689913B2

(12) United States Patent
Ma et al.

(10) Patent No.: US 11,689,913 B2
(45) Date of Patent: Jun. 27, 2023

(54) TERMINAL ROAMING METHOD AND APPARATUS, AND COMPUTER-READABLE STORAGE MEDIUM

(71) Applicant: HUAWEI TECHNOLOGIES CO., LTD., Shenzhen (CN)

(72) Inventors: Zhi Ma, Suzhou (CN); Xiaofei Bai, Suzhou (CN); Guozhi Ding, Wuhan (CN); Yongkang Guo, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/225,645

(22) Filed: Apr. 8, 2021

(65) Prior Publication Data
US 2021/0321246 A1 Oct. 14, 2021

(30) Foreign Application Priority Data

Apr. 10, 2020 (CN) .......................... 202010281300.7

(51) Int. Cl.
H04W 8/12 (2009.01)
H04W 76/11 (2018.01)
(Continued)

(52) U.S. Cl.
CPC ............... *H04W 8/12* (2013.01); *H04W 8/06* (2013.01); *H04W 8/26* (2013.01); *H04W 68/005* (2013.01); *H04W 76/11* (2018.02)

(58) Field of Classification Search
CPC ......... H04W 8/12; H04W 76/11; H04W 8/06; H04W 68/05
(Continued)

(56) References Cited

U.S. PATENT DOCUMENTS 7,920,879 B2 * 4/2011 Funato .................. H04W 48/20
455/426.2
9,253,703 B1 * 2/2016 Oroskar ............ H04W 36/0055
(Continued)

FOREIGN PATENT DOCUMENTS

CN 105284155 A 1/2016
CN 105430699 A 3/2016
(Continued)

OTHER PUBLICATIONS

"Draft Amendment to Standard For Standard for [Ed] Telecommunications and Information Exchange Between Systems—Local and Metropolitan Area Networks—Specific Requirements—Part 11 : Wireless LAN Medium Access Control (MAC) andPhysical Layer (PHY) specification: specification[Ed] Amendment 2: Fast BSS Transition",IEEE Draft; 11-06-1849-00-000R-P802.11 R-D3.1-REDLINE,IEEE-SA, Piscataway, NJ USA, vol. 802.11q drafts, No. D3.115, Nov. 15, 2006, XP068136639,total 150 pages.
(Continued)

Primary Examiner — Nghi H Ly
(74) Attorney, Agent, or Firm — Rimon PC

(57) ABSTRACT

This application discloses a terminal roaming method and apparatus. A terminal sends, to a first AP associated with the terminal, an action frame that is used to request to associate with a second AP. A receiver address of the action frame is an address of the first AP, and the action frame further includes an identifier of the second AP. When the terminal receives a response frame sent by the first AP for the action frame, and the response frame indicates that association succeeds, the terminal establishes association with the second AP. The terminal first establishes the association with the second AP by using the first AP, and then changes an operating channel to an operating channel of the second AP.
(Continued)

Now the terminal can receive and send data on the operating channel of the second AP.

11 Claims, 11 Drawing Sheets

(51) Int. Cl.
*H04W 8/06* (2009.01)
*H04W 8/26* (2009.01)
*H04W 68/00* (2009.01)

(58) Field of Classification Search
USPC ....... 370/329, 331, 328, 338, 341, 345, 350; 455/436, 442
See application file for complete search history.

(56) References Cited

U.S. PATENT DOCUMENTS

| | | | | |
|---|---|---|---|---|
| 2010/0027508 | A1* | 2/2010 | Jee | H04W 36/0011 370/331 |
| 2013/0059564 | A1* | 3/2013 | Jung | H04W 12/062 455/411 |
| 2015/0131616 | A1* | 5/2015 | Jo | H04W 36/00835 370/331 |
| 2019/0268818 | A1 | 8/2019 | Yi et al. | |

FOREIGN PATENT DOCUMENTS

| | | |
|---|---|---|
| CN | 107302774 A | 10/2017 |
| CN | 107306386 A | 10/2017 |
| CN | 107306456 A | 10/2017 |
| CN | 107454638 A | 12/2017 |
| EP | 2326121 A1 | 5/2011 |
| EP | 2975883 A1 | 1/2016 |
| EP | 3457756 A1 | 3/2019 |
| WO | 2007149509 A2 | 12/2007 |
| WO | 2019223679 A1 | 11/2019 |

OTHER PUBLICATIONS

"Draft Standard for Information Technology—Telecommunications and information exchange between systems—Local and metropolitan area networks Specific requirements Part 11 Wireless LAN Medium Access Control (MAC) and Physical Layer (PHY) specifications Amendment 2: Fast BSS Transition", ,IEEE P802.11r/D8.0> IEEE, Sep. 2007, Section 7.4.7, total 4 pages.

* cited by examiner

TERMINAL ROAMING METHOD AND APPARATUS, AND COMPUTER-READABLE STORAGE MEDIUM

CROSS-REFERENCE TO RELATED APPLICATION

This application claims priority to Chinese Patent Application No. 202010281300.7, filed on Apr. 10, 2020, which is hereby incorporated by reference in its entirety.

TECHNICAL FIELD

This application relates to the field of wireless communications technologies, and in particular, to a terminal roaming method and apparatus, and a computer-readable storage medium.

BACKGROUND

A wireless local area network (WLAN) includes an access point (AP) and a station (STA). The AP is used to provide a bridge function between the WLAN and another type of network (for example, a wired network). The STA refers to a terminal configured with a WLAN access function, for example, a smartphone or a laptop. In a moving process of a terminal in the WLAN, link quality decreases with an increase in a distance between the terminal and an associated AP and/or decreases due to an obstacle situated in between the terminal and the AP. In such case, terminal roaming may be triggered. The terminal roams to an AP that can provide a higher-quality link to meet a communication quality requirement for a service.

Currently, a roaming process of the terminal in the WLAN includes: The terminal first tears down an old link between the terminal and an originally associated AP, and then establishes a new link between the terminal and a target AP. A process of establishing the new link between the terminal and the target AP includes link authentication, association, and key agreement. A service layer cannot perceive the terminal roaming. Therefore, in the process of establishing the new link between the terminal and the target AP, the originally associated AP still receives a service packet sent by an upper-layer access device to the terminal. However, because the terminal has torn down the old link between the terminal and the originally associated AP, in other words, the terminal and the originally associated AP cannot communicate with each other, the originally associated AP discards the received service packet, resulting in packet discard. Consequently, communication reliability in a current roaming process of the terminal in the WLAN is relatively low.

SUMMARY

This application provides a terminal roaming method and apparatus, and a computer-readable storage medium, to resolve a problem that communication reliability in a current roaming process of a terminal in a WLAN is relatively low.

According to a first aspect, a terminal roaming method is provided, and is applied to a wireless local area network. The method includes: A terminal sends, to a first AP associated with the terminal, an action frame that is used to request to associate with a second AP, where a receiver address of the action frame is an address of the first AP, and the action frame further includes an identifier of the second AP. When the terminal receives a response frame sent by the first AP for the action frame, and the response frame indicates that association succeeds, the terminal establishes association with the second AP.

In the first aspect, the terminal first establishes the association with the second AP on an operating channel of the first AP by using the first AP, and then changes an operating channel from the operating channel of the first AP to an operating channel of the second AP. The terminal receives downlink data on the operating channel of the first AP before changing the operating channel. After changing the operating channel, the terminal may receive and send data on the operating channel of the second AP. This reduces a terminal roaming service interruption time, and can reduce packet discard in a terminal roaming process, to improve communication reliability.

Optionally, the response frame includes an association identifier (AID) allocated by the second AP to the terminal.

Optionally, the operating channels of the first AP and the second AP are different. After the terminal establishes the association with the second AP, when the terminal receives a switching notification sent by the first AP, and/or duration in which the terminal receives the response frame reaches target duration, the terminal changes the operating channel from the operating channel of the first AP to the operating channel of the second AP. The switching notification is sent by the first AP to the terminal after the first AP clears cache data corresponding to the terminal.

In the first aspect, the terminal receives the switching notification sent by the first AP, or the terminal switches the operating channel after the duration in which the terminal receives the response frame reaches the target duration. This can ensure that all downlink data that corresponds to the terminal and that is received by the first AP is sent to the terminal, to avoid the packet discard in the terminal roaming process.

Optionally, after the terminal changes the operating channel from the operating channel of the first AP to the operating channel of the second AP, the terminal sends an activation message to the second AP on the operating channel of the second AP. Optionally, the activation message may be an association request frame or any action frame.

Optionally, after the terminal sends, to the first AP, the action frame that is used to request to associate with the second AP, the terminal stops sending service data to the first AP.

Optionally, before the terminal sends, to the first AP, the action frame that is used to request to associate with the second AP, the terminal sends a fast transition request frame to the first AP. A receiver address in the fast transition request frame is the address of the first AP, and the fast transition request frame further includes the identifier of the second AP. The terminal receives a fast transition response frame sent by the first AP.

According to a second aspect, a terminal roaming method is provided, and is applied to a wireless local area network. The method includes: A first AP receives an action frame that is sent by a first terminal associated with the first AP and that is used to request to associate with a second AP, where a receiver address of the action frame is an address of the first AP, and the action frame further includes an identifier of the second AP. The first AP sends a first association request message obtained based on the action frame to the second AP, where the first association request message includes an identifier of the first terminal. The first AP sends, to the first terminal based on a result returned by the second AP for the first association request message, a response frame for the action frame, where the response frame is used to indicate whether association succeeds.

Optionally, if the response frame indicates that the association succeeds, the response frame includes an association identifier allocated by the second AP to the first terminal.

Optionally, after the first AP sends the response frame for the action frame to the first terminal, when no downlink data corresponding to the first terminal exists in the first AP, the first AP sends a switching notification to the first terminal, where the switching notification is used to indicate the first terminal to change an operating channel.

Optionally, the first AP further receives a fast transition request frame sent by the first terminal, where a receiver address in the fast transition request frame is the address of the first AP, and the fast transition request frame further includes the identifier of the second AP. The first AP sends, to the second AP, a fast transition message obtained based on the fast transition request frame, where the fast transition message includes the identifier of the first terminal. The first AP sends a fast transition response frame to the first terminal based on a result returned by the second AP for the fast transition message.

Optionally, the first AP further receives a second association request message sent by a third AP. The second association request message includes an identifier of a second terminal associated with the third AP, and the second association request message is obtained based on an action frame that is sent by the second terminal to the third AP and that is used to request to associate with the first AP. The first AP sends refresh indication information to an upper-layer access device. The refresh indication information includes the identifier of the second terminal, and the refresh indication information is used to indicate the upper-layer access device to send downlink data corresponding to the second terminal to the first AP. When the first AP receives the downlink data that corresponds to the second terminal and that is sent by the upper-layer access device, the first AP caches the downlink data corresponding to the second terminal.

In the second aspect, the first AP triggers the upper-layer access device to refresh an ARP table, so that the upper-layer access device sends the downlink data corresponding to the terminal to the first AP. Then, after clearing cache data corresponding to the terminal, the third AP sends, to the terminal, a switching notification used to indicate the terminal to change the operating channel. This can ensure that all downlink data that corresponds to the terminal and that is received by the third AP is sent to the terminal, to avoid packet discard in a terminal roaming process.

Optionally, when the first AP receives an activation message sent by the second terminal, the first AP sends the downlink data corresponding to the second terminal to the second terminal.

According to a third aspect, a terminal roaming method is provided, and is applied to a wireless local area network. The method includes: A first AP obtains first downlink data that corresponds to a terminal and that is stored in a second AP, where the second AP is an originally associated AP of the terminal. After the first AP is successfully associated with the terminal, the first AP sends the first downlink data to the terminal.

In the third aspect, a target roaming AP of the terminal may obtain downlink data that corresponds to the terminal and that is stored in the originally associated AP of the terminal, and after the target roaming AP is successfully associated with the terminal, send the downlink data to the terminal, to prevent from discarding the downlink data that corresponds to the terminal and that is stored in the originally associated AP of the terminal. In this way, packet discard of the terminal in a roaming process is avoided, and communication reliability is improved.

Optionally, after the first AP receives an association request frame sent by the terminal, or after the first AP is successfully associated with the terminal, the first AP sends refresh indication information to an upper-layer access device. The refresh indication information includes an identifier of the terminal, and the refresh indication information is used to indicate the upper-layer access device to send second downlink data corresponding to the terminal to the first AP. When the first AP receives the second downlink data that corresponds to the terminal and that is sent by the upper-layer access device, the first AP caches the second downlink data. After the first AP finishes sending the first downlink data to the terminal, the first AP sends the second downlink data to the terminal.

In the third aspect, the first downlink data is sent by the upper-layer access device to the second AP, and the second downlink data is sent by the upper-layer access device to the first AP. A sending moment of the second downlink data is later than a sending moment of the first downlink data. The first AP first sends the first downlink data to the terminal, and then sends the second downlink data to the terminal. This can ensure that the terminal receives a data packet in a normal service sequence, to improve the communication reliability.

Optionally, the first AP receives a fast transition request message sent by the second AP, and the fast transition request message is obtained based on a fast transition request frame sent by the terminal to the first AP. A receiver address in the fast transition request frame is an address of the second AP, and the fast transition request frame further includes an identifier of the first AP.

Optionally, each data packet in the first downlink data carries a corresponding identifier. After the first AP receives the association request frame sent by the terminal, the first AP sends a terminal roaming complete notification to the second AP, where the terminal roaming complete notification is used to indicate that the terminal has disconnected communication with the second AP. The first AP receives an identifier list sent by the second AP, where the identifier list includes an identifier of a data packet that is not sent by the second AP to the terminal. An implementation process in which the first AP sends the first downlink data to the terminal includes: The first AP determines, based on the identifier list, that the second AP does not send, in the first downlink data, a target data packet to the terminal. The first AP sends the target data packet to the terminal.

In the third aspect, after the first AP obtains the first downlink data that corresponds to the terminal and that is stored in the second AP, and before the first AP receives the association request frame sent by the terminal, an operating channel of the terminal is still an operating channel of the second AP. In this process, the second AP may further continue to send a data packet in the first downlink data to the terminal. Therefore, the first downlink data obtained by the first AP may include a data packet that has been sent by the second AP to the terminal. After receiving the terminal roaming complete notification sent by the first AP, the second AP sends, to the first AP, an identifier list including the identifier of the data packet that is not sent by the second AP to the terminal, to prevent the first AP from repeatedly sending the packet to the terminal.

Optionally, an implementation process in which a first AP obtains first downlink data that corresponds to a terminal and that is stored in a second AP includes: The first AP sends a data obtaining request to the second AP, where the data obtaining request includes the identifier of the terminal. The first AP receives the first downlink data that is sent by the second AP based on the data obtaining request.

According to a fourth aspect, a terminal roaming apparatus is provided. The apparatus includes a plurality of function modules, and the plurality of function modules interact with each other to implement the method in the first aspect and the implementations of the first aspect. The plurality of function modules may be implemented based on software, hardware, or a combination of software and hardware, and the plurality of function modules may be randomly combined or divided based on a specific implementation.

According to a fifth aspect, a terminal roaming apparatus is provided. The apparatus includes a plurality of function modules, and the plurality of function modules interact with each other to implement the method in the second aspect and the implementations of the second aspect. The plurality of function modules may be implemented based on software, hardware, or a combination of software and hardware, and the plurality of function modules may be randomly combined or divided based on a specific implementation.

According to a sixth aspect, a terminal roaming apparatus is provided. The apparatus includes a plurality of function modules, and the plurality of function modules interact with each other to implement the method in the third aspect and the implementations of the third aspect. The plurality of function modules may be implemented based on software, hardware, or a combination of software and hardware, and the plurality of function modules may be randomly combined or divided based on a specific implementation.

According to a seventh aspect, a terminal is provided, including a processor and a memory.

The memory is configured to store a computer program, and the computer program includes a program instruction.

The processor is configured to invoke the computer program to implement the terminal roaming method according to any one of the first aspect.

According to an eighth aspect, an access point (AP) is provided, including a processor and a memory.

The memory is configured to store a computer program, and the computer program includes a program instruction.

The processor is configured to invoke the computer program to implement the terminal roaming method according to any one of the second aspect or the third aspect.

According to a ninth aspect, a computer-readable storage medium is provided. The computer-readable storage medium stores an instruction, and when the instruction is executed by a computer device, the terminal roaming method according to any one of the first aspect, the second aspect, or the third aspect is implemented.

According to a tenth aspect, a chip is provided. The chip includes a programmable logic circuit and/or a program instruction. When the chip runs, the method in the first aspect, the second aspect, or the third aspect, and the implementations of the first aspect, the second aspect, or the third aspect is implemented.

The technical solutions provided in this application have at least the following beneficial effects.

The terminal first establishes the association with the second AP on the operating channel of the first AP by using the first AP, and then changes the operating channel from the operating channel of the first AP to the operating channel of the second AP. The terminal receives downlink data on the operating channel of the first AP before changing the operating channel. After changing the operating channel, the terminal may receive and send the data on the operating channel of the second AP. This reduces the terminal roaming service interruption time, and can reduce the packet discard in the terminal roaming process, to improve the communication reliability. When the first AP is the target roaming AP of the terminal, the first AP triggers the upper-layer access device to refresh the ARP list, so that the upper-layer access device sends the downlink data corresponding to the terminal to the first AP, then sends, after the originally associated AP of the terminal clears the cache data corresponding to the terminal, the switching notification used to indicate the terminal to change the operating channel to the terminal, so that the terminal receives the switching notification sent by the originally associated AP. Alternatively, the terminal switches the operating channel after the duration in which the terminal receives the response frame reaches the target duration. This can ensure that all the downlink data that corresponds to the terminal and that is received by the originally associated AP is sent to the terminal, to avoid the packet discard in the terminal roaming process.

Alternatively, the target roaming AP of the terminal may obtain the downlink data that corresponds to the terminal and that is stored in the originally associated AP of the terminal, and send the downlink data to the terminal after being successfully associated with the terminal, to prevent from discarding the downlink data that corresponds to the terminal and that is stored in the originally associated AP of the terminal. In this way, the packet discard of the terminal in the roaming process is avoided, and the communication reliability is improved.

DESCRIPTION OF EMBODIMENTS

To make the objectives, technical solutions, and advantages of this application clearer, the following further describes implementations of this application in detail with reference to accompanying drawings.

Figure 1:
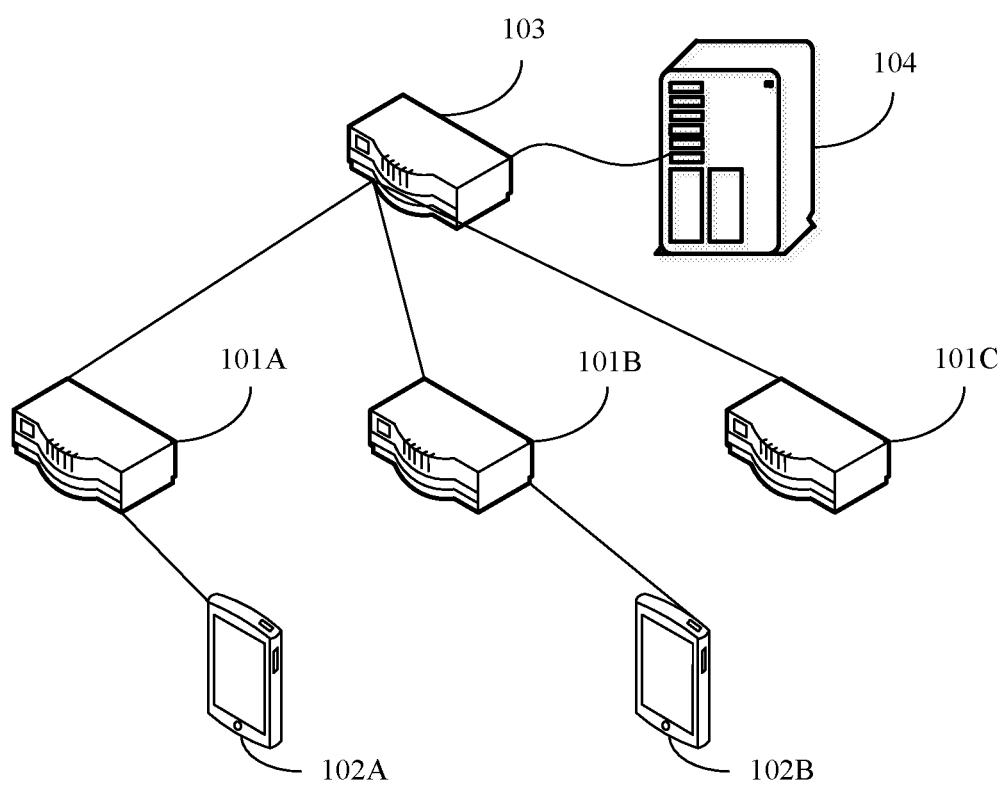
FIG. 1 is a schematic structural diagram of a terminal roaming system according to an embodiment of this application.

FIG. 1 is a schematic structural diagram of a terminal roaming system according to an embodiment of this application. As shown in FIG. 1, the terminal roaming system includes APs 101A to 101C (collectively referred to as an AP 101) and terminals 102A and 102B (collectively referred to as a terminal 102) in a WLAN. The terminal 102A is associated with the AP 101A, and the terminal 102B is associated with the AP 101B. Quantities of APs and terminals in the figure are merely used as examples for description, and are not intended to limit the WLAN provided in this embodiment of this application.

The AP 101 is a network device having a WLAN chip or a WLAN system on a chip (system on a chip, SoC). For example, the AP 101 may be a router, a switch, or the like. The WLAN chip includes some radio circuits, and may be divided into an application layer, a media access control (MAC) layer, and a physical layer based on functions. In addition to all functions of the WLAN chip, the Wi-Fi SoC includes a logical core configured to run an operating system. The AP 101 further includes a power supply module, an interface and a storage peripheral device, a radio frequency circuit, an antenna, and the like.

Figure 2:
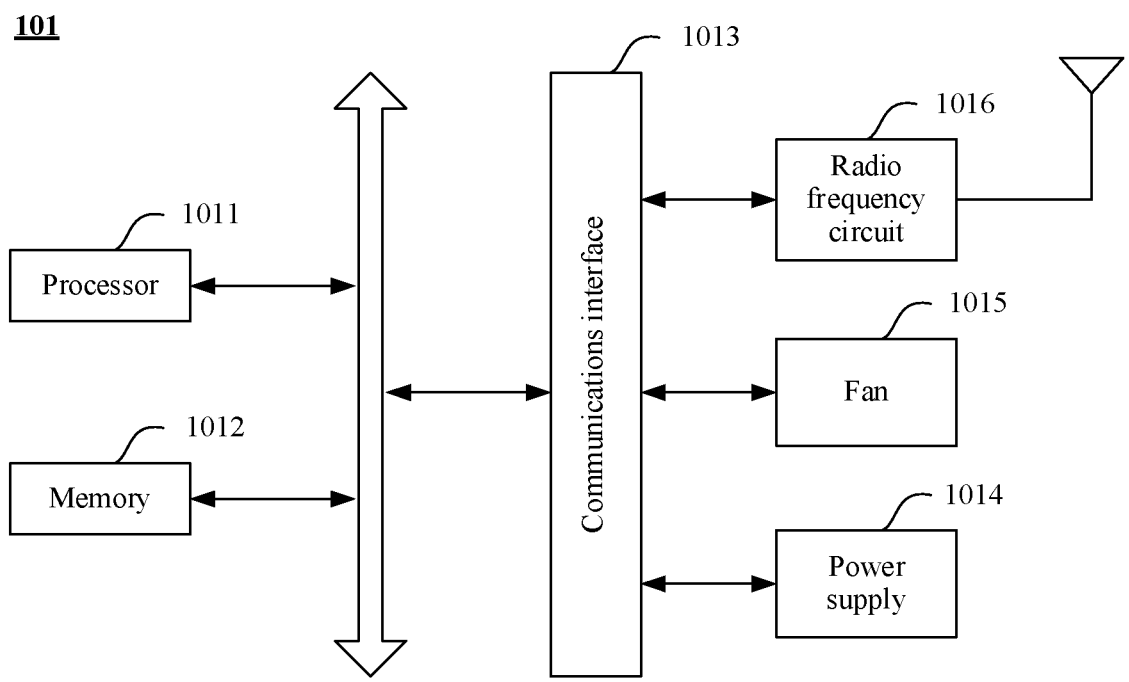
FIG. 2 is a schematic structural diagram of an AP according to an embodiment of this application.

For example, FIG. 2 is a schematic structural diagram of an AP according to an embodiment of this application. As shown in FIG. 2, the AP 101 includes a processor 1011, a memory 1012, a communications interface 1013, and a plurality of peripheral devices. The processor 1011, the memory 1012, and the communications interface 1013 are connected to each other through a bus or a signal cable. Each peripheral device is connected to the communications interface 1013 through the bus, the signal cable, or a circuit board. The peripheral device may include one or more of a power supply 1014, a fan 1015, and a radio frequency circuit 1016.

The processor 1011 may include one or more processing cores, for example, a 4-core processor or an 8-core processor. The processor 1011 includes a central processing unit (CPU). The processor 1011 may further include a hardware circuit, for example, a digital signal processor (DSP), a field programmable gate array (FPGA), or a programmable logic array (PLA). The memory 1012 may include one or more computer-readable storage media. The memory 1012 may include a volatile memory and/or a nonvolatile memory, for example, one or more magnetic disk storage devices or flash storage devices. The communications interface 1013 may be configured to connect at least one peripheral device related to input/output (I/O) to the processor 1011 and the memory 1012. The processor 1011, the memory 1012, and the communications interface 1013 may be integrated into a same chip or a same circuit board. Alternatively, any one or two of the processor 1011, the memory 1012, and the communications interface 1013 may be implemented on a separate chip or a separate circuit board. This is not limited in this embodiment of this application. The chip may be a WLAN chip or a WLAN system on a chip. The power supply 1014 is configured to supply power to each component in the AP 101. The fan 1015 is configured to cool each component in the AP 101. The radio frequency circuit is configured to receive and transmit radio frequency (RF) signals also called electromagnetic signals. The radio frequency circuit 1016 communicates with another device in the WLAN by using the electromagnetic signal. The radio frequency circuit 1016 converts an electrical signal into an electromagnetic signal for transmission, or converts a received electromagnetic signal into an electrical signal. Optionally, the radio frequency circuit 1016 includes an antenna system, an RF transceiver, one or more amplifiers, a tuner, an oscillator, a digital signal processor, a codec chip set, or the like.

Figure 3:
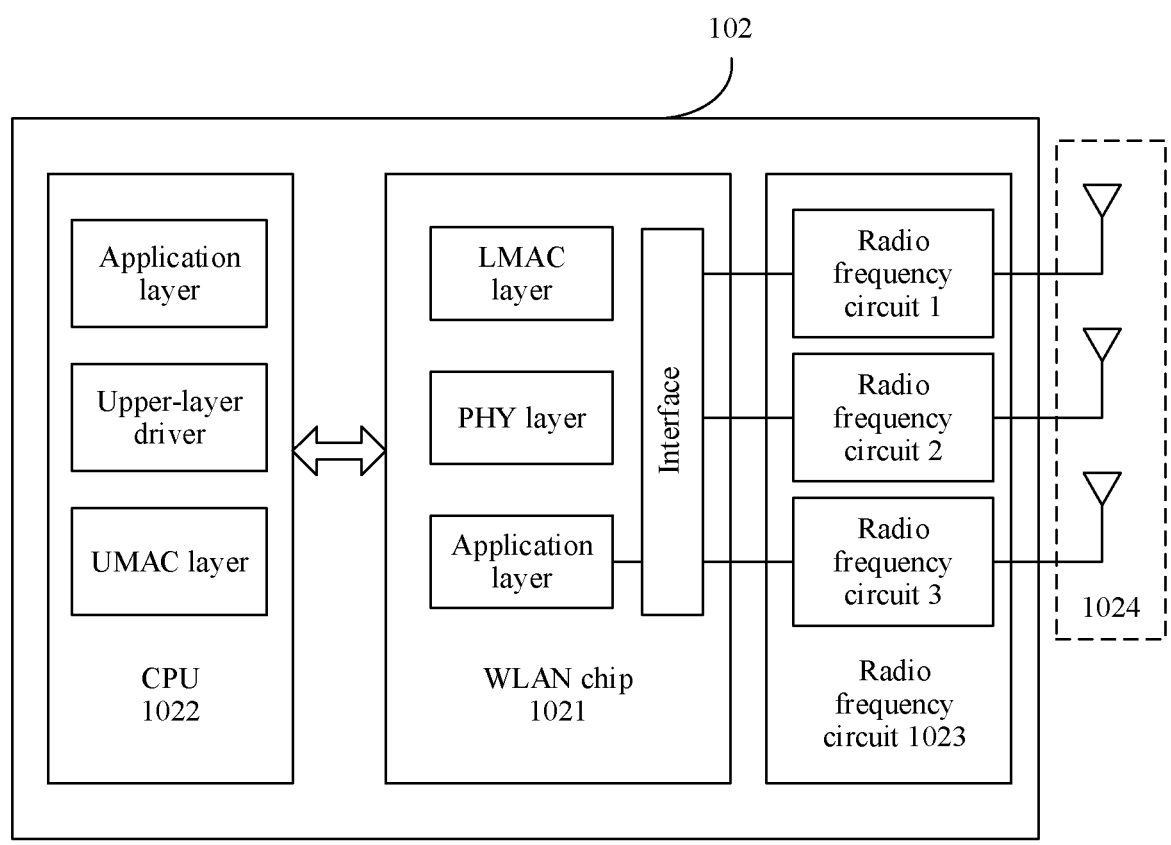
FIG. 3 is a schematic structural diagram of a terminal according to an embodiment of this application.

The terminal 102 is a smartphone, a notebook computer, an intelligent wearable device, or the like that has a WLAN chip. For example, FIG. 3 is a schematic structural diagram of a terminal according to an embodiment of this application. As shown in FIG. 3, the terminal 102 includes a WLAN chip 1021, a CPU 1022, a radio frequency circuit 1023, and an antenna 1024. The WLAN chip 1021 includes an LMAC (low MAC) layer, a physical (PHY) layer, and an application layer. The CPU 1022 includes a UMAC (up MAC) layer, an upper-layer driver, and an application layer. The application layer in the WLAN chip 1021 is connected to the radio frequency circuit 1023 through an interface, to receive and send data.

Optionally, still referring to FIG. 1, the terminal roaming system further includes an upper-layer access device 103 and a network controller 104. The upper-layer access device 103 is connected to the AP 101 in a wired manner. The upper-layer access device 103 may be a network switch or a gateway. The upper-layer access device 103 is configured to connect the internet and the WLAN. The network controller 104 is connected to the AP 101 in the wired manner. Referring to FIG. 1, the network controller 104 may be indirectly connected to the AP 101 by using the upper-layer access device 103. Alternatively, the network controller 104 may be directly connected to the AP 101. This is not limited in this embodiment of this application. The network controller 104 is configured to manage the AP 101, for example, may configure an operating channel of the AP 101. The upper-layer access device 103 and the network controller 104 may be independent devices, or the upper-layer access device 103 and the network controller 104 may be integrated into one device.

Figure 4A:
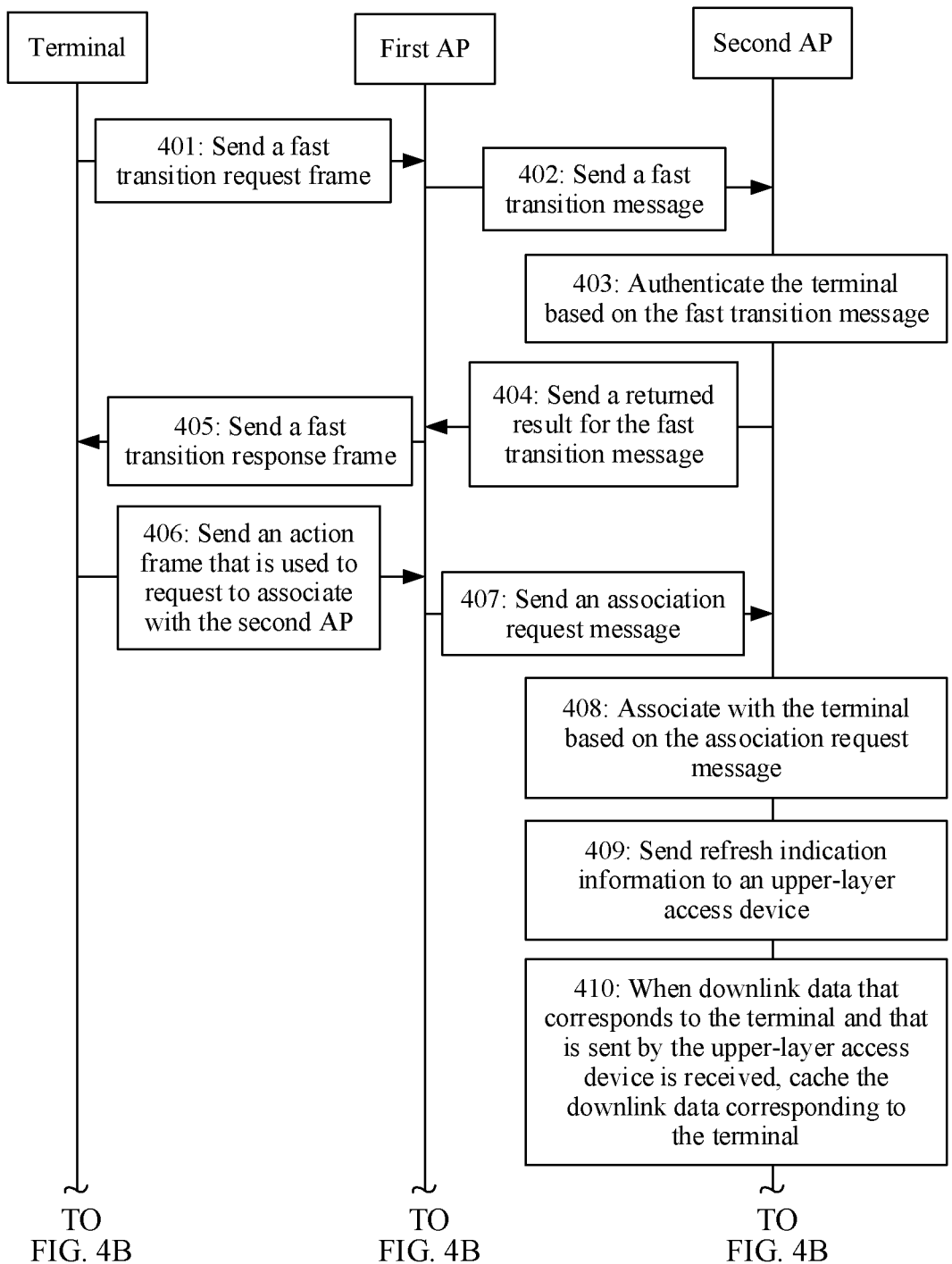
FIG. 4A and FIG. 4B are a schematic flowchart of a terminal roaming method according to an embodiment of this application.
Figure 4B:
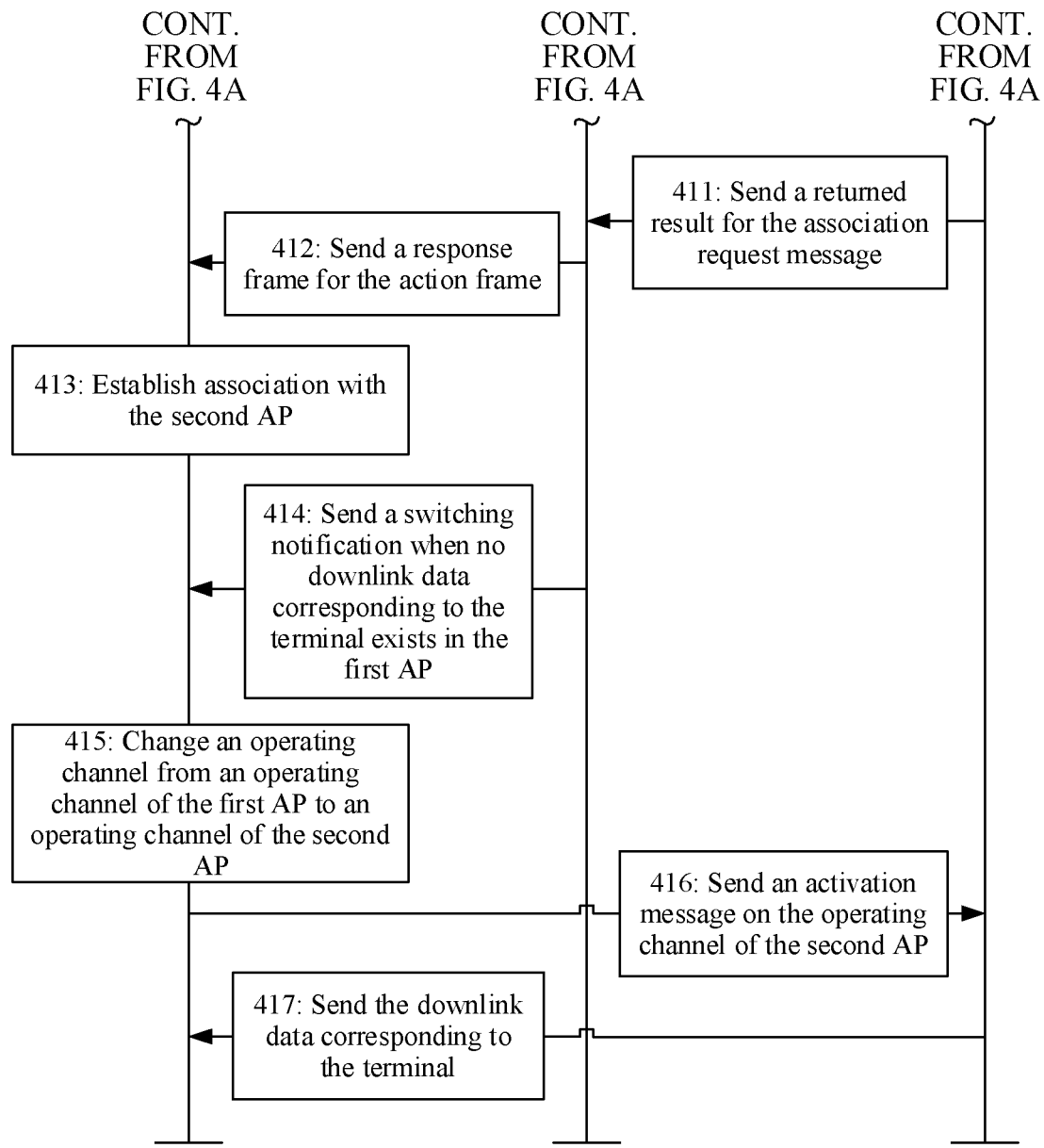

FIG. 4A and FIG. 4B are a schematic flowchart of a terminal roaming method according to an embodiment of this application. The method may be applied to the terminal roaming system shown in FIG. 1. As shown in FIG. 4A and FIG. 4B, the method includes the following steps.

Step 401: A terminal sends a fast transition request frame to a first AP.

The terminal is associated with the first AP. A receiver address in the fast transition request frame is an address of the first AP, and is specifically a MAC address of the first AP. The fast transition request frame further includes an identifier of a second AP. The identifier of the second AP may be information that can uniquely identify the second AP, for example, a MAC address or a hardware address of the second AP.

Figure 5:
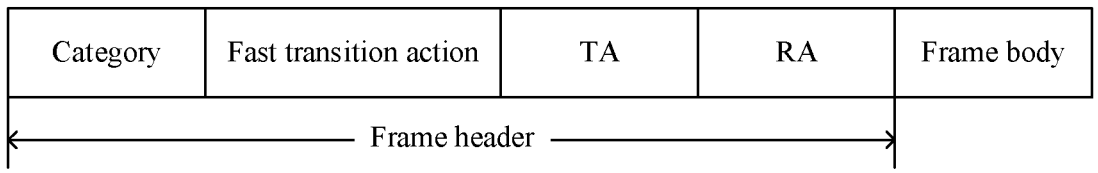
FIG. 5 is a schematic structural diagram of a fast transition request frame according to an embodiment of this application.

For example, FIG. 5 is a schematic structural diagram of a fast transition request frame according to an embodiment of this application. As shown in FIG. 5, the fast transition request frame includes a frame header and a frame body. The frame header includes a category field, a fast transition (FT) action field, a transmitter address (TA) field, and a receiver address (RA) field. As defined in the Institute of Electrical and Electronics Engineers (institute of electrical and electronics engineers, IEEE) 802.11r protocol, a value of an FT action field in the fast transition request (FT request) frame is 1. For definitions and explanations of fields in the fast transition request frame, refer to the IEEE 802.11r protocol. Details are not described in this embodiment of this application. Optionally, the identifier of the second AP may be carried in the frame body of the fast transition request frame.

Optionally, the second AP is a neighboring AP of the first AP. An overlapping area exists between a signal coverage area of the first AP and a signal coverage area of the second AP. When the terminal moves from the signal coverage area of the first AP to the signal coverage area of the second AP, strength of a signal received by the terminal from the second AP is greater than strength of a signal received by the terminal from the first AP, and/or the strength of the signal received by the terminal from the first AP is less than a signal strength threshold, the terminal triggers the terminal to perform roaming switching. In this case, the terminal sends the fast transition request frame to the first AP. Alternatively, an associated AP of the terminal may trigger the terminal to perform roaming switching. A condition for triggering the terminal to perform roaming switching is not limited in this embodiment of this application.

Step 402: The first AP sends a fast transition message to the second AP.

The fast transition message is obtained based on the fast transition request frame. The fast transition message may be a fast transition request frame, or may be a new message generated by the first AP based on the fast transition request frame. The new message includes information in the fast transition request frame. A message type and a message format of the fast transition message are not limited in this embodiment of this application. The fast transition message includes an identifier of the terminal. The identifier of the terminal may be a MAC address of the terminal. After receiving the fast transition request frame sent by the terminal, the first AP obtains the MAC address of the terminal from a transmitter address field of the fast transition request frame.

Optionally, the first AP sends the fast transition message to the second AP by using a distributed system (DS). The distributed system includes an upper-layer access device and/or a network controller. The first AP may send the fast transition message to the second AP by using the upper-layer access device, or the first AP may send the fast transition message to the second AP by using the network controller.

Optionally, the fast transition message includes an internet protocol (Internet Protocol, IP) address of the terminal.

Step 403: The second AP authenticates the terminal based on the fast transition message.

Optionally, after receiving the fast transition message, the second AP authenticates the terminal in compliance with the IEEE 802.11r protocol. An authentication process is not described in this embodiment of this application. The second AP may further record the IP address of the terminal.

Step 404: The second AP sends a returned result for the fast transition message to the first AP.

The returned result for the fast transition message includes an authentication result of the terminal. Optionally, when the second AP fails to authenticate the terminal based on the fast transition message, the second AP may not send the returned result for the fast transition message to the first AP.

Step 405: The first AP sends a fast transition response frame to the terminal.

The fast transition response frame is obtained based on the result returned by the second AP for the fast transition message. The fast transition response frame is used to indicate whether the second AP successfully authenticates the terminal.

Optionally, after receiving the result returned by the second AP for the fast transition message, the first AP generates the fast transition response frame based on the returned result. Alternatively, when the first AP does not receive, within specified duration after sending the fast transition message to the second AP, the returned result for the fast transition message, the first AP generates the fast transition response frame, where the fast transition response frame indicates that the second AP fails to authenticate the terminal.

After the second AP successfully authenticates the terminal, step 406 continues to be performed. Optionally, step 401 to step 405 may not be performed. For example, when the WLAN is an open network, step 406 may be directly performed.

Step 406: The terminal sends, to the first AP, an action frame that is used to request to associate with the second AP.

A receiver address of the action frame is the address of the first AP, and is specifically the MAC address of the first AP. The action frame further includes the identifier of the second AP.

Optionally, an action frame is defined in this embodiment of this application. For a frame structure of the action frame, refer to the fast transition request frame shown in FIG. 5. Currently, a category of a data frame is not defined in the IEEE 802.11r protocol when a value of an FT action field ranges from 5 to 255. Therefore, a value of an FT action field in the action frame may be any value from 5 to 255. For example, the value being 5 may indicate that the data frame is an action frame that is used to request to associate with an AP. A TA field in the action frame carries the MAC address of the terminal, and an RA field carries the MAC address of the first AP. A frame body includes information used by the terminal to request to associate with the second AP, for example, includes various parameters of the terminal and various parameters selected according to a service configuration. The parameters mainly include a supported rate, a supported channel, a supported quality of service (QoS) capability, a selected access authentication, a selected encryption algorithm, and the like.

Optionally, after the terminal sends, to the first AP, the action frame that is used to request to associate with the second AP, the terminal stops sending service data to the first AP.

Step 407: The first AP sends an association request message to the second AP.

The association request message is obtained based on the action frame that is used to request to associate with the second AP. The association request message may be the action frame that is used to request to associate with the second AP, or may be a new message generated by the first AP based on the action frame that is used to request to associate with the second AP. The new message includes information in the action frame that is used to request to associate with the second AP. A message type and a message format of the association request message are not limited in this embodiment of this application. The association request message includes the identifier of the terminal. The identifier of the terminal may be the MAC address of the terminal. After receiving the action frame that is sent by the terminal and that is used to request to associate with the second AP, the first AP obtains the MAC address of the terminal from a transmitter address field of the action frame.

Optionally, the first AP sends the association request message to the second AP by using the DS. For a specific implementation process, refer to the related descriptions in step 402. Details are not described again in this embodiment of this application.

Optionally, the association request message includes the IP address of the terminal.

Step 408: The second AP is associated with the terminal based on the association request message.

Optionally, after receiving the association request message, the second AP obtains the information that is in the association request message and that is used by the terminal to request to associate with the second AP, and is associated with the terminal in compliance with the IEEE 802.11 series protocol by using the information. An association process is not described again in this embodiment of this application.

Step 409: The second AP sends refresh indication information to the upper-layer access device.

The refresh indication information includes the identifier of the terminal. The refresh indication information is used to indicate the upper-layer access device to send downlink data corresponding to the terminal to the second AP. Optionally, when the second AP receives the association request message sent by the first AP, or after the second AP is successfully associated with the terminal based on the association request message, the second AP sends the refresh indication information to the upper-layer access device.

Optionally, the identifier of the terminal may be the IP address of the terminal. After receiving the refresh indication information sent by the second AP, the upper-layer access device refreshes a MAC address table and/or an address resolution protocol (address resolution protocol, ARP) table in the upper-layer access device, so that after the upper-layer access device receives the downlink data corresponding to the terminal, the upper-layer access device sends the downlink data corresponding to the terminal to the second AP, to implement data diversion.

Optionally, step 409 may not be performed. For example, the first AP may send the refresh indication information to the upper-layer access device, to indicate the upper-layer access device to send the downlink data corresponding to the terminal to the second AP. Alternatively, the upper-layer access device is indicated to simultaneously send the downlink data corresponding to the terminal to the first AP and the second AP. In other words, the upper-layer device is indicated to bidirectionally send the downlink data corresponding to the terminal to an originally associated AP and a target roaming AP of the terminal. A manner of triggering a table of the upper-layer access device is not limited in this embodiment of this application.

Step 410: When the second AP receives the downlink data that corresponds to the terminal and that is sent by the upper-layer access device, the second AP caches the downlink data corresponding to the terminal.

In this embodiment of this application, after the terminal sends, to the first AP, the action frame that is used to request to associate with the second AP, an operating channel of the terminal is still an operating channel of the first AP. Before the terminal changes the operating channel to an operating channel of the second AP, the second AP caches the downlink data that corresponds to the terminal and that is sent by the upper-layer access device, to avoid packet discard.

Step 411: The second AP sends a returned result for the association request message to the first AP.

The returned result for the association request message includes a result of association between the second AP and the terminal. Optionally, when the second AP fails to associate with the terminal based on the association request message, the second AP may not send the returned result for the association request message to the first AP.

Step 412: The first AP sends a response frame for the action frame to the terminal.

The response frame is obtained based on the result returned by the second AP for the association request message. The response frame is used to indicate whether the second AP is successfully associated with the terminal.

Optionally, after receiving the result returned by the second AP for the association request message, the first AP generates the response frame for the action frame based on the returned result. Alternatively, when the first AP does not receive, within specified duration after sending the association request message to the second AP, the returned result for the association request message, the first AP generates the response frame for the action frame, where the response frame indicates that the second AP fails to associate with the terminal. In this embodiment of this application, for a frame structure of the response frame for the action frame, refer to a frame structure of the fast transition response frame. Details are not described in this embodiment of this application.

Optionally, when the response frame indicates that the second AP is successfully associated with the terminal, the response frame further includes an association identifier allocated by the second AP to the terminal.

Optionally, after the second AP is successfully associated with the terminal, the following step 413 to step 417 continue to be performed.

Step 413: The terminal establishes association with the second AP.

In this embodiment of this application, that the terminal establishes association with the second AP includes: The terminal stores a radio configuration parameter of the second AP. The radio configuration parameter of the second AP may include an encryption mode, a traffic priority parameter, and the like of the second AP.

Optionally, the operating channels of the first AP and the second AP are different. After the terminal establishes the association with the second AP, the operating channel of the terminal is still the operating channel of the first AP, and the terminal may continue to receive, on the operating channel of the first AP, downlink data sent by the first AP, to avoid the packet discard of the downlink data corresponding to the terminal in the first AP.

Optionally, if the operating channels of the first AP and the second AP are different, after establishing the association with the second AP, the terminal may further continue to perform the following step 414 to step 417, to change the operating channel of the terminal from the operating channel of the first AP to the operating channel of the second AP at an appropriate time, so that the terminal roams from the first AP to the second AP. Alternatively, the terminal may change the operating channel immediately after associating with the second AP.

Step 414: When no downlink data corresponding to the terminal exists in the first AP, the first AP sends a switching notification to the terminal.

The switching notification is used to indicate the terminal to change the operating channel. Optionally, the switching notification may be a basic service set (basic service set, BSS) transition management request (transition management request) frame defined in the IEEE 802.11v.

Optionally, when the first AP finishes sending the downlink data corresponding to the terminal to the terminal, in other words, when the first AP clears cache data corresponding to the terminal, the first AP sends the switching notification to the terminal.

In this embodiment of this application, the second AP triggers the upper-layer access device to refresh the ARP table, so that the upper-layer access device sends the downlink data corresponding to the terminal to the second AP. Then, after clearing the cache data corresponding to the terminal, the first AP sends, to the terminal, the switching notification used to indicate the terminal to change the operating channel. This can ensure that all downlink data that corresponds to the terminal and that is received by the first AP is sent to the terminal, to avoid packet discard in a terminal roaming process.

Step 415: The terminal changes the operating channel from the operating channel of the first AP to the operating channel of the second AP.

Optionally, when the terminal receives the switching notification sent by the first AP and/or duration in which the terminal receives the response frame reaches target duration, the terminal changes the operating channel from the operating channel of the first AP to the operating channel of the second AP. Because the terminal has established the association with the second AP, after the terminal changes the operating channel to the operating channel of the second AP, the terminal can receive and send data on the operating channel of the second AP.

When the terminal receives the switching notification sent by the first AP, it indicates that the first AP has cleared the cache data corresponding to the terminal. A volume of the downlink data that corresponds to the terminal and that is stored in the first AP is limited, and after the first AP sends, within the target duration, the response frame to the terminal, the first AP may finishing sending the stored downlink data corresponding to the terminal to the terminal. Therefore, the terminal may alternatively change the operating channel after the duration in which the terminal receives the response frame reaches the target duration.

In this embodiment of this application, the terminal first establishes association with the second AP on the operating channel of the first AP by using the first AP, and then changes the operating channel from the operating channel of the first AP to the operating channel of the second AP. The terminal receives the downlink data on the operating channel of the first AP before changing the operating channel. After changing the operating channel, the terminal may receive and send the data on the operating channel of the second AP. This reduces a terminal roaming service interruption time, to improve communication reliability in the terminal roaming process.

Step 416: The terminal sends an activation message to the second AP on the operating channel of the second AP.

The activation message is used to indicate the second AP to restore communication with the terminal. Optionally, the activation message may be the association request frame or any action frame. A message type of the activation message is not limited in this embodiment of this application.

Step 417: The second AP sends the downlink data corresponding to the terminal to the terminal.

Optionally, the second AP sends the cached downlink data corresponding to the terminal and newly received downlink data that corresponds to the terminal and that is sent by the upper-layer access device to the terminal. If the second AP does not receive the activation message within specified duration after sending the returned result (the returned result indicates that the association succeeds) for the association request message to the first AP, the second AP cancels the association with the terminal.

A sequence of the steps of the method embodiment provided in this embodiment of this application can be appropriately adjusted. For example, step 411 may be performed before step 409 and step 410, or step 411, step 409, and step 410 may be simultaneously performed. The steps may also be correspondingly added or deleted based on a situation. For example, step 401 to step 405 may not be performed. Any variation readily figured out by a person skilled in the art within the technical scope disclosed in this application shall fall within the protection scope of this application, and details are not described herein.

In conclusion, in the terminal roaming method provided in this embodiment of this application, the terminal first establishes the association with the second AP on the operating channel of the first AP by using the first AP, and then changes the operating channel from the operating channel of the first AP to the operating channel of the second AP. The terminal receives the downlink data on the operating channel of the first AP before changing the operating channel. After changing the operating channel, the terminal may receive and send the data on the operating channel of the second AP. This reduces the terminal roaming service interruption time, and can reduce the packet discard in the terminal roaming process, to improve the communication reliability. In addition, when the operating channel of the terminal is the operating channel of the first AP, the second AP triggers the upper-layer access device to refresh the ARP table, so that the upper-layer access device sends the downlink data corresponding to the terminal to the second AP. Then, after clearing the cache data corresponding to the terminal, the first AP sends the switching notification used to indicate the terminal to change the operating channel to the terminal. This can ensure that all the downlink data that corresponds to the terminal and that is received by the first AP is sent to the terminal, to avoid the packet discard in the terminal roaming process, and further improve the communication reliability.

Figure 6:
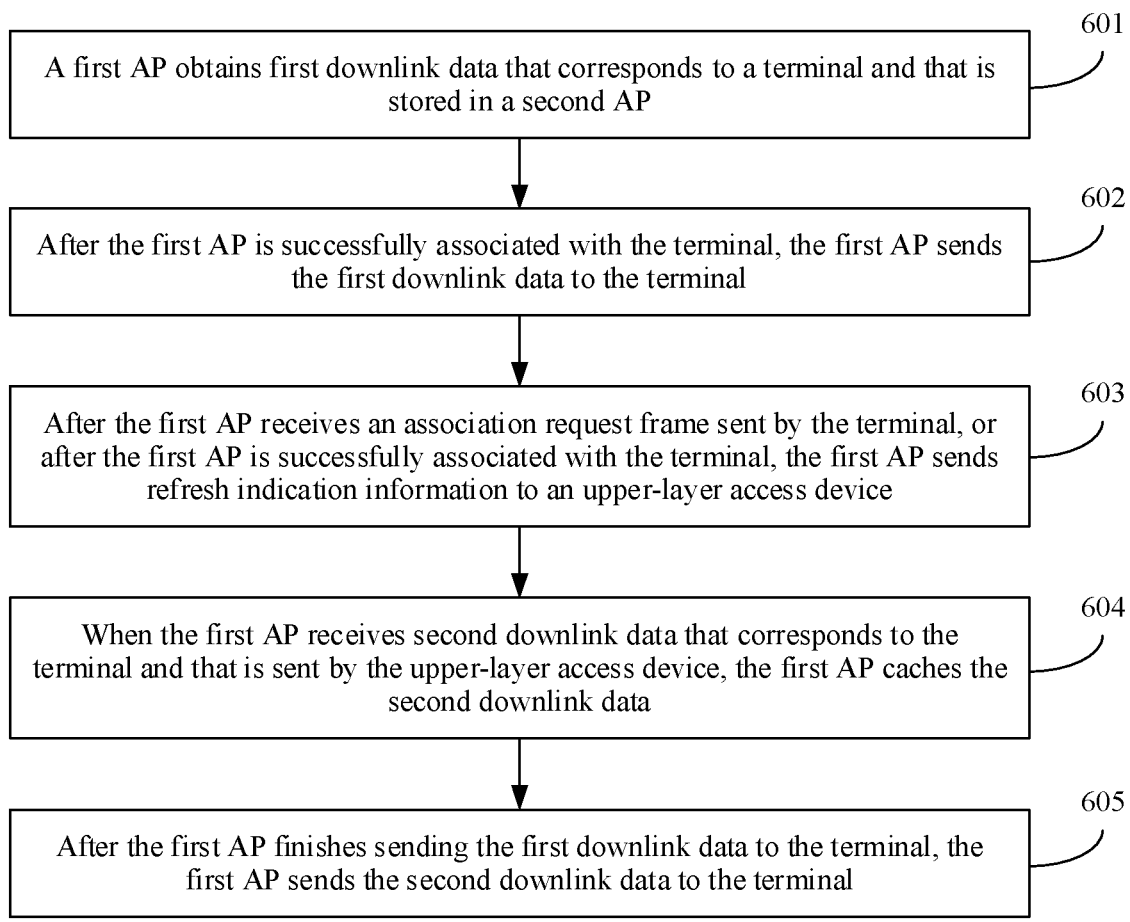
FIG. 6 is a schematic flowchart of another terminal roaming method according to an embodiment of this application.

FIG. 6 is a schematic flowchart of another terminal roaming method according to an embodiment of this application. The method may be applied to the terminal roaming system shown in FIG. 1. As shown in FIG. 6, the method includes the following steps.

Step 601: A first AP obtains first downlink data that corresponds to a terminal and that is stored in a second AP.

The second AP is an originally associated AP of the terminal, and the first AP is a target roaming AP of the terminal. Optionally, before obtaining the first downlink data that corresponds to the terminal and that is stored in the second AP, the first AP first authenticates the terminal.

In a first optional embodiment of this application, the first AP receives a fast transition request message sent by the second AP, and the fast transition request message is obtained based on a fast transition request frame sent by the terminal to the first AP. A receiver address in the fast transition request frame is an address of the second AP, and the fast transition request frame further includes an identifier of the first AP. The first AP authenticates the terminal based on a fast transition message. For an authentication process, refer to the related descriptions of step 401 to step 405. Details are not described again in this embodiment of this application.

Optionally, after the second AP receives a returned result sent by the first AP for the fast transition message, and the returned result indicates that authentication succeeds, the second AP sends, to the first AP, the first downlink data that corresponds to the terminal and that is stored in the second AP. When the second AP receives new downlink data that corresponds to the terminal and that is sent by an upper-layer access device, the second AP synchronously sends the new downlink data corresponding to the terminal to the first AP. After the second AP sends the first downlink data corresponding to the terminal to the first AP, the second AP may still store the first downlink data. Before the terminal disconnects communication with the second AP, the second AP may continue to send a data packet in the stored first downlink data to the terminal. Optionally, each data packet in the first downlink data carries a corresponding identifier, and the identifier uniquely identifies the data packet.

Optionally, after the first AP receives an association request frame sent by the terminal, the first AP sends a terminal roaming complete notification to the second AP, where the terminal roaming complete notification is used to indicate that the terminal has disconnected the communication with the second AP.

In a second optional embodiment of this application, the first AP receives an authentication request frame sent by the terminal, then authenticates the terminal based on the authentication request frame, and returns an authentication response frame to the terminal. For an authentication process, refer to a stipulation in the IEEE 802.11 series protocol. Details are not described in this embodiment of this application. The first AP first determines the originally associated AP of the terminal, and then obtains, from the originally associated AP of the terminal, the first downlink data corresponding to the terminal. The first AP determines the originally associated AP of the terminal in a plurality of manners. For example, the first AP determines the originally associated AP of the terminal based on a current AP address (current AP address) field in a re-association request frame sent by the terminal, where an address in the current AP address field is an address of the originally associated AP of the terminal. Alternatively, the first AP determines the originally associated AP of the terminal from a network controller. Alternatively, after being successfully associated with the first AP, the terminal queries the neighboring AP of the first AP for the originally associated AP of the terminal. The manner in which the first AP determines the originally associated AP of the terminal is not limited in this embodiment of this application.

Optionally, an implementation process in which a first AP obtains first downlink data that corresponds to a terminal and that is stored in a second AP includes: The first AP sends a data obtaining request to the second AP, where the data obtaining request includes an identifier of the terminal. The first AP receives the first downlink data that is sent by the second AP based on the data obtaining request.

Optionally, after the second AP finishes sending the first downlink data corresponding to the terminal to the first AP, the second AP sends a data sending complete message to the first AP. When the first AP receives the data sending complete message sent by the second AP, and/or when duration from a sending moment at which the first AP sends the data obtaining request exceeds target duration, the first AP stops receiving data sent by the second AP.

In this embodiment of this application, after the second AP determines that the terminal has disconnected the communication with the second AP, the second AP may store all downlink data that corresponds to the terminal and that is not successfully sent. After the second AP sends the downlink data to the first AP, the second AP deletes the downlink data. Optionally, when the second AP receives the terminal roaming complete notification sent by the first AP, the second AP determines that the terminal has disconnected the communication with the second AP. Alternatively, when the second AP receives a disassociation frame sent by the terminal, the second AP determines that the terminal has disconnected the communication with the second AP. Alternatively, when the second AP does not receive an acknowledgment frame within specified duration after sending a data packet to the terminal, the second AP determines that the terminal has disconnected the communication with the second AP.

In this embodiment of this application, after determining that the terminal disconnects communication with the originally associated AP of the terminal, the originally associated AP of the terminal stores downlink data that is not successfully sent to the terminal, so that the target roaming AP of the terminal can obtain the downlink data, to avoid packet discard in a terminal roaming process.

Step 602: After the first AP is successfully associated with the terminal, the first AP sends first downlink data to the terminal.

Optionally, referring to the first optional embodiment in the foregoing step 601, after the second AP sends the fast transition request message to the first AP, an operating channel of the terminal is still an operating channel of the second AP. In this case, the second AP may continue to send the data packet in the stored first downlink data to the terminal. After receiving the terminal roaming complete notification sent by the first AP, the second AP stops sending the data packet in the first downlink data to the terminal, and sends an identifier list to the first AP, where the identifier list includes an identifier of a data packet that is not sent by the second AP to the terminal. After receiving the identifier list sent by the second AP, the first AP determines, based on the identifier list, a target data packet that is in the first downlink data and that is not sent by the second AP to the terminal. Then, the first AP sends the target data packet to the terminal.

For example, if the first downlink data obtained by the first AP includes a data packet 1, a data packet 2, a data packet 3, and a data packet 4, and the identifier list received by the first AP includes an identifier of the data packet 3 and an identifier of the data packet 4, the first AP determines that the second AP does not send the data packet 3 and the data packet 4 to the terminal. Then, the first AP deletes the data packet 1 and the data packet 2, and sends the data packet 3 and the data packet 4 to the terminal.

In this embodiment of this application, after the first AP obtains the first downlink data that corresponds to the terminal and that is stored in the second AP, and before the first AP receives the association request frame sent by the terminal, the operating channel of the terminal is still the operating channel of the second AP. In this process, the second AP may further continue to send the data packet in the first downlink data to the terminal. Therefore, the first downlink data obtained by the first AP may include a data packet that has been sent by the second AP to the terminal. After receiving the terminal roaming complete notification sent by the first AP, the second AP sends, to the first AP, the identifier list including the identifier of the data packet that is not sent by the second AP to the terminal, to prevent the first AP from repeatedly sending the packet to the terminal.

Alternatively, the second AP may send the first downlink data to the first AP after receiving the terminal roaming complete notification sent by the first AP, where the first downlink data includes a data packet that is not sent by the second AP to the terminal.

Optionally, after step 602 is performed, the following step 603 to step 605 may further continue to be performed.

Step 603: After the first AP receives the association request frame sent by the terminal, or after the first AP is successfully associated with the terminal, the first AP sends refresh indication information to the upper-layer access device.

The refresh indication information includes the identifier of the terminal. The refresh indication information is used to indicate the upper-layer access device to send second downlink data corresponding to the terminal to the first AP. For an implementation process in which the first AP sends refresh indication information to the upper-layer access device, refer to an implementation process in which the second AP sends refresh indication information to the upper-layer access device in step 409. Details are not described again in this embodiment of this application.

Step 604: When the first AP receives the second downlink data that corresponds to the terminal and that is sent by the upper-layer access device, the first AP caches the second downlink data.

In this embodiment of this application, the second AP caches the downlink data that corresponds to the terminal and that is sent by the upper-layer access device, to avoid the packet discard.

Step 605: After the first AP finishes sending the first downlink data to the terminal, the first AP sends the second downlink data to the terminal.

The first downlink data is sent by the upper-layer access device to the second AP, and the second downlink data is sent by the upper-layer access device to the first AP. A sending moment of the second downlink data is later than a sending moment of the first downlink data. The first AP first sends the first downlink data to the terminal, and then sends the second downlink data to the terminal. This can ensure that the terminal receives a data packet in a normal service sequence, to improve communication reliability.

A sequence of the steps of the method embodiment provided in this embodiment of this application can be appropriately adjusted, and the steps can also be correspondingly added or deleted based on a situation. Any variation readily figured out by a person skilled in the art within the technical scope disclosed in this application shall fall within the protection scope of this application, and details are not described herein.

In conclusion, in the terminal roaming method provided in this embodiment of this application, after determining that the terminal disconnects the communication with the originally associated AP of the terminal, the originally associated AP of the terminal stores the downlink data that is not successfully sent to the terminal. The target roaming AP of the terminal may obtain the downlink data that corresponds to the terminal and that is stored in the originally associated AP of the terminal, and send the downlink data to the terminal after being successfully associated with the terminal, to prevent from discarding the downlink data that corresponds to the terminal and that is stored in the originally associated AP of the terminal. In this way, the packet discard of the terminal in the roaming process is avoided, and the communication reliability is improved.

Figure 7:
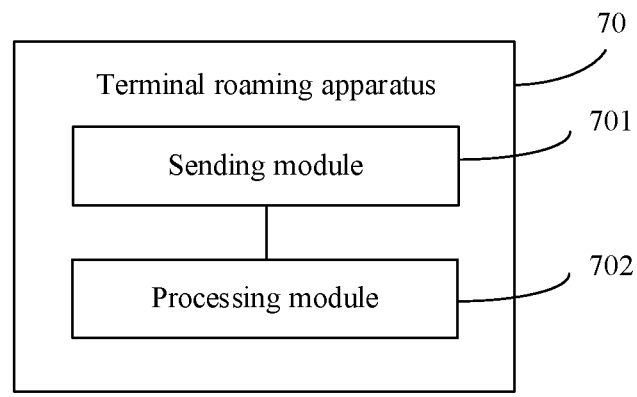
FIG. 7 is a schematic structural diagram of a terminal roaming apparatus according to an embodiment of this application.

FIG. 7 is a schematic structural diagram of a terminal roaming apparatus according to an embodiment of this application. The apparatus is applied to a terminal in a wireless local area network, for example, may be applied to the terminal 102 in the terminal roaming system shown in FIG. 1. As shown in FIG. 7, the apparatus 70 includes:

a sending module 701, configured to send, to a first AP associated with the terminal, an action frame that is used to request to associate with a second AP, where a receiver address of the action frame is an address of the first AP, and the action frame further includes an identifier of the second AP; and a processing module 702, configured to: when the terminal receives a response frame sent by the first AP for the action frame, and the response frame indicates that association succeeds, establish association with the second AP.

Optionally, the response frame includes an association identifier allocated by the second AP to the terminal.

Optionally, operating channels of the first AP and the second AP are different. The processing module 702 is further configured to: after the terminal establishes the association with the second AP, when the terminal receives a switching notification sent by the first AP, and/or duration in which the terminal receives the response frame reaches target duration, change an operating channel from the operating channel of the first AP to the operating channel of the second AP.

Optionally, the sending module 701 is further configured to: after the terminal changes the operating channel from the operating channel of the first AP to the operating channel of the second AP, send an activation message to the second AP on the operating channel of the second AP.

Optionally, the processing module 702 is further configured to: after the terminal sends, to the first AP, the action frame that is used to request to associate with the second AP, control the sending module 701 to stop sending service data to the first AP.

Figure 8:
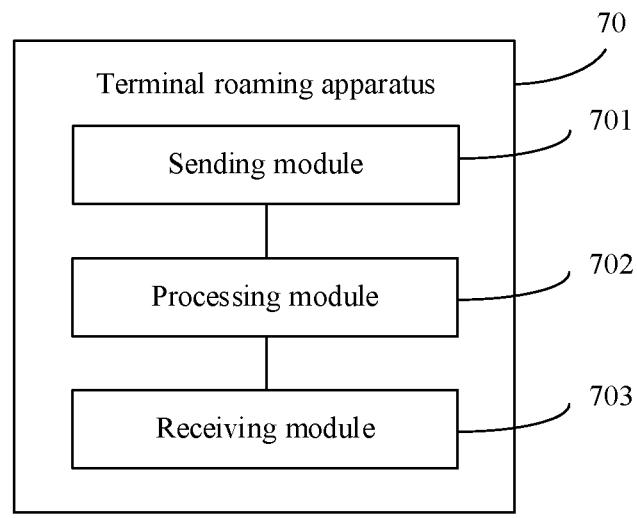
FIG. 8 is a schematic structural diagram of another terminal roaming apparatus according to an embodiment of this application.

Optionally, as shown in FIG. 8, the apparatus 70 further includes a receiving module 703.

The sending module 701 is further configured to send a fast transition request frame to the first AP, where a receiver address in the fast transition request frame is the address of the first AP, and the fast transition request frame further includes the identifier of the second AP. The receiving module 703 is configured to receive a fast transition response frame sent by the first AP.

In conclusion, in the terminal roaming apparatus provided in this embodiment of this application, the terminal first establishes the association with the second AP on the operating channel of the first AP by using the first AP, and then changes the operating channel from the operating channel of the first AP to the operating channel of the second AP. The terminal receives downlink data on the operating channel of the first AP before changing the operating channel. After changing the operating channel, the terminal may receive and send data on the operating channel of the second AP. This reduces a terminal roaming service interruption time, and can reduce packet discard in a terminal roaming process, to improve communication reliability. In addition, when the operating channel of the terminal is the operating channel of the first AP, the second AP triggers an upper-layer access device to refresh an ARP table, so that the upper-layer access device sends downlink data corresponding to the terminal to the second AP. Then, after clearing cache data corresponding to the terminal, the first AP sends the switching notification used to indicate the terminal to change the operating channel to the terminal. This can ensure that all downlink data that corresponds to the terminal and that is received by the first AP is sent to the terminal, to avoid the packet discard in the terminal roaming process, and further improve the communication reliability.

Figure 9:
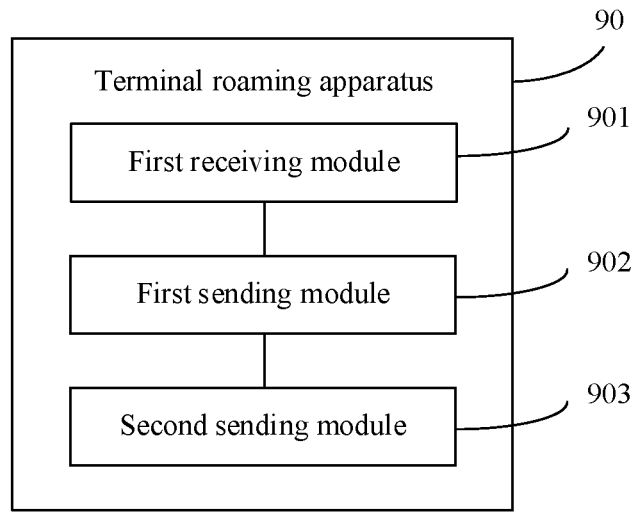
FIG. 9 is a schematic structural diagram of still another terminal roaming apparatus according to an embodiment of this application.

FIG. 9 is a schematic structural diagram of still another terminal roaming apparatus according to an embodiment of this application. The apparatus is applied to a first AP in a wireless local area network, for example, may be applied to the AP 101 in the terminal roaming system shown in FIG. 1. As shown in FIG. 9, the apparatus 90 includes:

a first receiving module 901, configured to receive an action frame that is sent by a first terminal associated with the first AP and that is used to request to associate with a second AP, where a receiver address of the action frame is an address of the first AP, and the action frame further includes an identifier of the second AP;

a first sending module 902, configured to send a first association request message obtained based on the action frame to the second AP, where the first association request message includes an identifier of the first terminal; and a second sending module 903, configured to send, based on a result returned by the second AP for the first association request message, a response frame for the action frame to the first terminal, where the response frame is used to indicate whether association succeeds.

Optionally, if the response frame indicates that the association succeeds, the response frame includes an association identifier allocated by the second AP to the first terminal.

Optionally, the second sending module 903 is further configured to: after the first AP sends the response frame for the action frame to the first terminal, when no downlink data corresponding to the first terminal exists in the first AP, send a switching notification to the first terminal, where the switching notification is used to indicate the first terminal to change an operating channel.

Optionally, the first receiving module 901 is further configured to receive a fast transition request frame sent by the first terminal, where a receiver address in the fast transition request frame is the address of the first AP, and the fast transition request frame further includes the identifier of the second AP. The first sending module 902 is further configured to send, to the second AP, a fast transition message obtained based on the fast transition request frame, where the fast transition message includes the identifier of the first terminal. The second sending module 903 is further configured to send a fast transition response frame to the first terminal based on a result returned by the second AP for the fast transition message.

Figure 10:
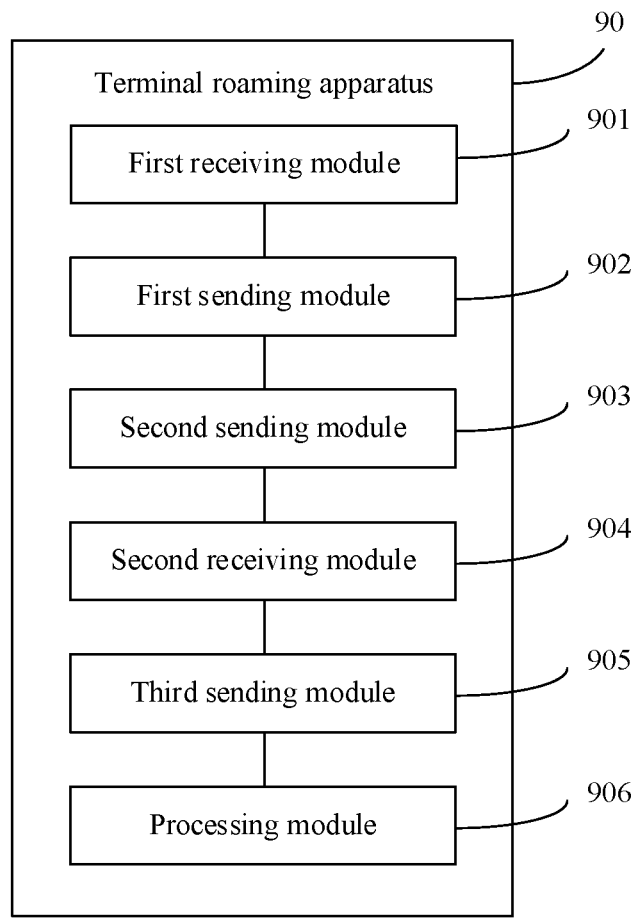
FIG. 10 is a schematic structural diagram of yet another terminal roaming apparatus according to an embodiment of this application.

Optionally, as shown in FIG. 10, the apparatus 90 further includes:

a second receiving module 904, configured to receive a second association request message sent by a third AP, where the second association request message includes an identifier of a second terminal associated with the third AP, and the second association request message is obtained based on an action frame that is sent by the second terminal to the third AP and that is used to request to associate with the first AP;

a third sending module 905, configured to send refresh indication information to an upper-layer access device, where the refresh indication information includes the identifier of the second terminal, and the refresh indication information is used to indicate the upper-layer access device to send downlink data corresponding to the second terminal to the first AP; and a processing module 906, configured to: when the first AP receives the downlink data that corresponds to the second terminal and that is sent by the upper-layer access device, cache the downlink data corresponding to the second terminal.

Optionally, the second sending module 903 is further configured to: when the first AP receives an activation message sent by the second terminal, send the downlink data corresponding to the second terminal to the second terminal.

In conclusion, in the terminal roaming apparatus provided in this embodiment of this application, the terminal first establishes association with the second AP on an operating channel of the first AP by using the first AP, and then changes the operating channel from the operating channel of the first AP to an operating channel of the second AP. The terminal receives downlink data on the operating channel of the first AP before changing the operating channel. After changing the operating channel, the terminal may receive and send data on the operating channel of the second AP. This reduces a terminal roaming service interruption time, and can reduce packet discard in a terminal roaming process, to improve communication reliability. In addition, when the operating channel of the terminal is the operating channel of the first AP, the second AP triggers the upper-layer access device to refresh an ARP table, so that the upper-layer access device sends downlink data corresponding to the terminal to the second AP. Then, after clearing cache data corresponding to the terminal, the first AP sends the switching notification used to indicate the terminal to change the operating channel to the terminal. This can ensure that all downlink data that corresponds to the terminal and that is received by the first AP is sent to the terminal, to avoid the packet discard in the terminal roaming process, and further improve the communication reliability.

Figure 11:
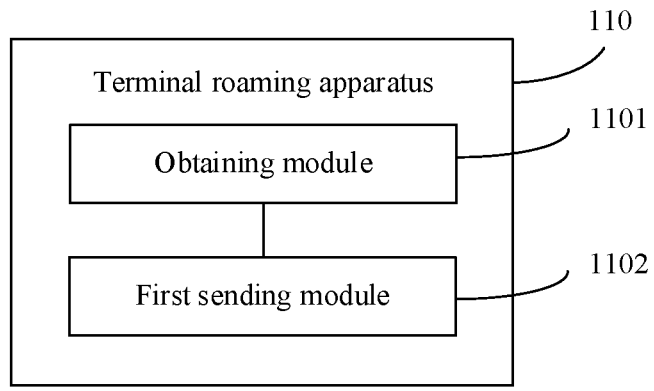
FIG. 11 is a schematic structural diagram of a terminal roaming apparatus according to another embodiment of this application.

FIG. 11 is a schematic structural diagram of a terminal roaming apparatus according to another embodiment of this application. The apparatus is applied to a first AP in a wireless local area network, for example, may be applied to the AP 101 in the terminal roaming system shown in FIG. 1. As shown in FIG. 11, the apparatus 110 includes:

an obtaining module 1101, configured to obtain first downlink data that corresponds to a terminal and that is stored in a second AP, where the second AP is an originally associated AP of the terminal; and a first sending module 1102, configured to send the first downlink data to the terminal after the first AP is successfully associated with the terminal.

Figure 12:
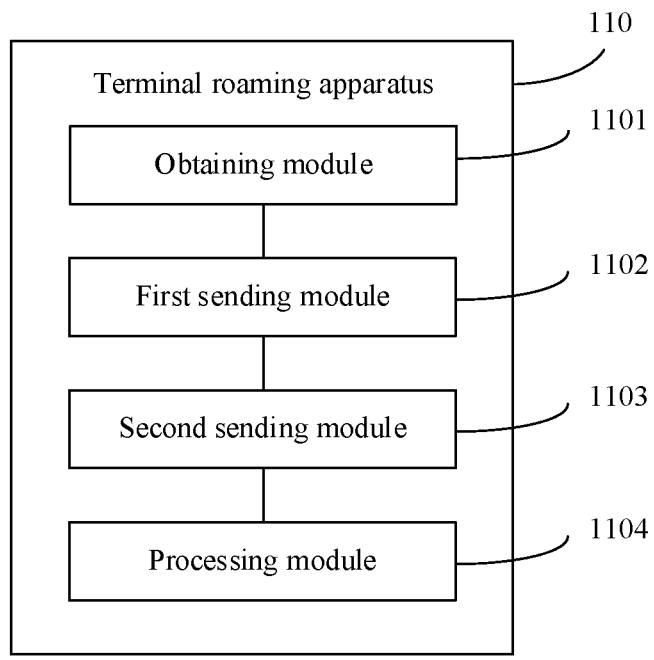
FIG. 12 is a schematic structural diagram of another terminal roaming apparatus according to another embodiment of this application.

Optionally, as shown in FIG. 12, the apparatus 110 further includes a second sending module 1103 and a processing module 1104.

The second sending module 1103 is configured to: after the first AP receives an association request frame sent by the terminal, or after the first AP is successfully associated with the terminal, send refresh indication information to an upper-layer access device. The refresh indication information includes an identifier of the terminal, and the refresh indication information is used to indicate the upper-layer access device to send second downlink data corresponding to the terminal to the first AP. The processing module 1104 is configured to: when the first AP receives the second downlink data that corresponds to the terminal and that is sent by the upper-layer access device, cache the second downlink data. The first sending module 1102 is further configured to send the second downlink data to the terminal after the first AP finishes sending the first downlink data to the terminal.

Figure 13:
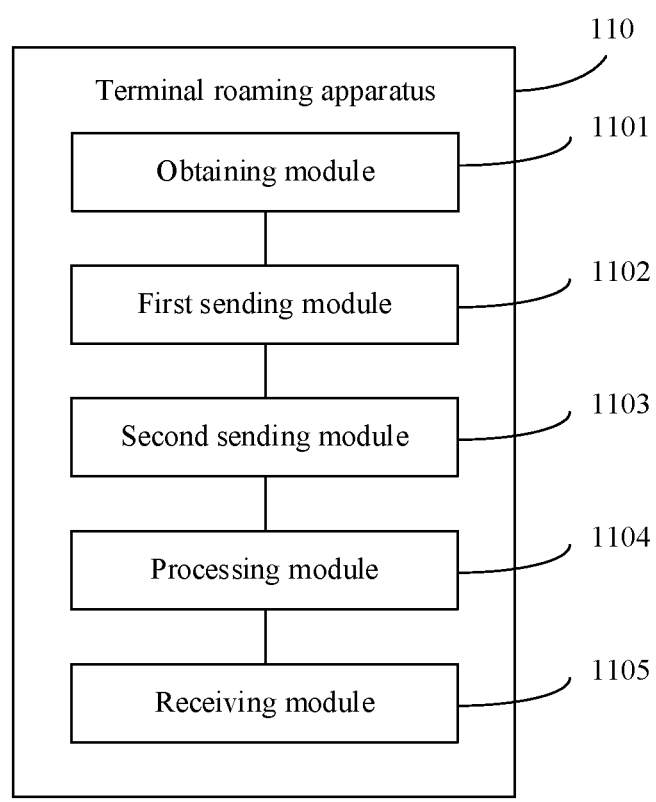
FIG. 13 is a schematic structural diagram of still another terminal roaming apparatus according to another embodiment of this application.

Optionally, as shown in FIG. 13, the apparatus 110 further includes:

a receiving module 1105, configured to receive a fast transition request message sent by the second AP, where the fast transition request message is obtained based on a fast transition request frame sent by the terminal to the first AP, a receiver address in the fast transition request frame is an address of the second AP, and the fast transition request frame further includes an identifier of the first AP.

Figure 14:
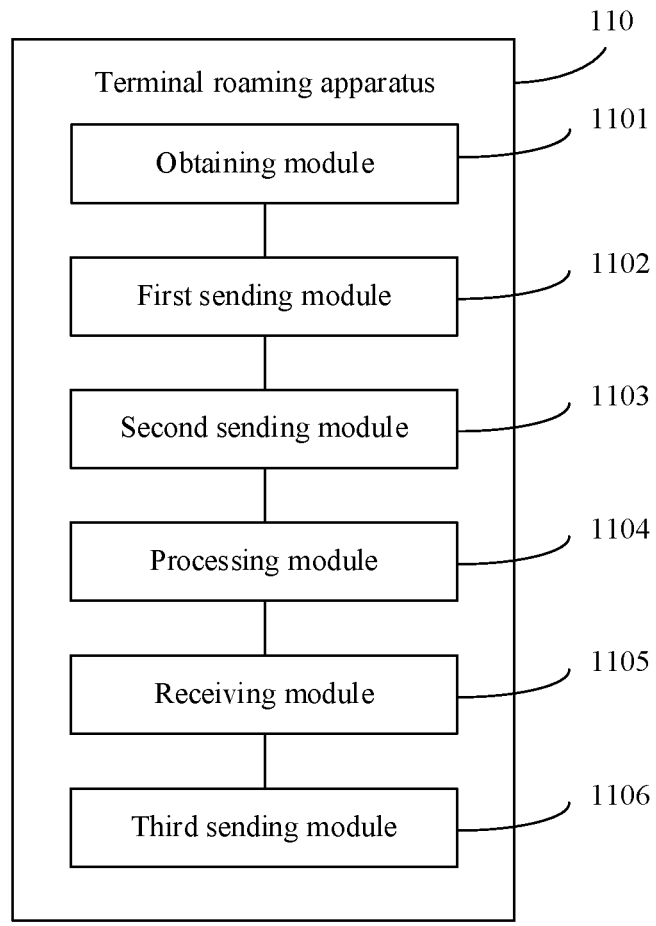
FIG. 14 is a schematic structural diagram of yet another terminal roaming apparatus according to another embodiment of this application.

Optionally, each data packet in the first downlink data carries a corresponding identifier. As shown in FIG. 14, the apparatus further includes a third sending module 1106.

The third sending module 1106 is configured to send a terminal roaming complete notification to the second AP after the first AP receives the association request frame sent by the terminal, where the terminal roaming complete notification is used to indicate that the terminal has disconnected communication with the second AP. The receiving module 1105 is further configured to receive an identifier list sent by the second AP, where the identifier list includes an identifier of a data packet that is not sent by the second AP to the terminal. The first sending module 1102 is configured to: determine, based on the identifier list, a target data packet that is in the first downlink data and that is not sent by the second AP to the terminal; and send the target data packet to the terminal.

Optionally, the obtaining module 1101 is configured to: send a data obtaining request to the second AP, where the data obtaining request includes the identifier of the terminal; and receive the first downlink data that is sent by the second AP based on the data obtaining request.

In conclusion, in the terminal roaming apparatus provided in this embodiment of this application, after determining that the terminal disconnects communication with the originally associated AP of the terminal, the originally associated AP stores downlink data that is not successfully sent to the terminal. A target roaming AP of the terminal may obtain downlink data that corresponds to the terminal and that is stored in the originally associated AP of the terminal, and send the downlink data to the terminal after being successfully associated with the terminal, to prevent from discarding the downlink data that corresponds to the terminal and that is stored in the originally associated AP of the terminal. In this way, packet discard of the terminal in a roaming process is avoided, and communication reliability is improved.

For the apparatus in the foregoing embodiment, a specific manner of executing an operation by each module is described in detail in the embodiments related to the method, and details are not described herein.

An embodiment of this application provides a terminal, including a processor and a memory.

The memory is configured to store a computer program, and the computer program includes a program instruction.

The processor is configured to invoke the computer program to implement an action performed by the terminal in the foregoing method embodiments.

An embodiment of this application provides an AP, including a processor and a memory.

The memory is configured to store a computer program, and the computer program includes a program instruction.

The processor is configured to invoke the computer program to implement an action performed by the AP in the foregoing method embodiments.

Figure 15:
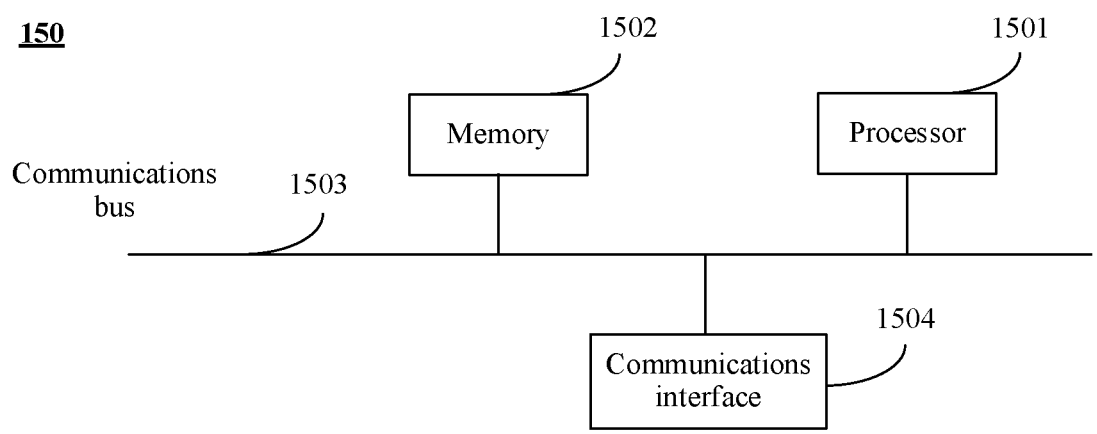
FIG. 15 is a block diagram of a terminal roaming apparatus according to an embodiment of this application.

For example, FIG. 15 is a block diagram of a terminal roaming apparatus according to an embodiment of this application. The apparatus may be a terminal or an AP. As shown in FIG. 15, the apparatus 150 includes a processor 1501 and a memory 1502.

The memory 1502 is configured to store a computer program, and the computer program includes a program instruction.

The processor 1501 is configured to invoke the computer program to implement an action performed by the terminal or the AP in the foregoing method embodiments.

Optionally, the apparatus 150 further includes a communications bus 1503 and a communications interface 1504.

The processor 1501 includes one or more processing cores, and the processor 1501 executes various function applications and data processing by running the computer program.

The memory 1502 may be configured to store the computer program. Optionally, the memory may store an operating system and an application program unit required by at least one function. The operating system may be an operating system, for example, real-time executive (Real-Time Executive, RTX), Linux, Unix, Windows, or OS X.

There may be a plurality of communications interfaces 1504, and the communications interface 1504 is configured to communicate with another device. For example, in this embodiment of this application, the communications interface of the terminal may be configured to send various types of requests to the AP.

The memory 1502 and the communications interface 1504 are separately connected to the processor 1501 through the communications bus 1503.

An embodiment of this application further provides a computer-readable storage medium. The computer-readable storage medium stores an instruction. When the instruction is executed by a computer device, the terminal roaming method provided in the foregoing method embodiment is implemented. When the instruction is executed by a processor of a terminal, an action performed by the terminal in the foregoing method embodiments is implemented. Alternatively, when the instruction is executed by a processor of an AP, an action executed by the AP in the foregoing method embodiments is implemented.

A person of ordinary skill in the art may understand that all or some of the steps of the embodiments may be implemented by hardware or a program instructing related hardware. The program may be stored in a computer-readable storage medium, and the storage medium may include a read-only memory, a magnetic disk, or an optical disc.

In the embodiments of this application, the terms "first", "second", and "third" are merely used for a purpose of description, and shall not be understood as an indication or implication of relative importance.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are merely optional embodiments of this application, but are not intended to limit this application. Any modification, equivalent replacement, or improvement made without departing from the concept and principle of this application should fall within the protection scope of this application.

What is claimed is:

1. A terminal roaming method, applied to a wireless local area network, wherein the method comprises:
   sending, by a terminal to a first access point (AP) associated with the terminal, a first action frame that is used to request to associate with a second AP, wherein a receiver address of the first action frame is an address of the first AP, and the first action frame further comprises an identifier of the second AP;
   when the terminal receives a response frame sent by the first AP for the first action frame, and the response frame comprises an association identifier allocated by the second AP to the terminal and the response frame indicates that association succeeds, establishing, by the terminal, an association with the second AP;
   receiving, by the first AP, a second association request message sent by a third AP, wherein the second association request message comprises an identifier of a second terminal associated with the third AP, and the second association request message is obtained based on a second action frame that is sent by the second terminal to the third AP and that is used to request to associate with the first AP;
   sending, by the first AP, refresh indication information to an upper-layer access device, wherein the refresh indication information comprises the identifier of the second terminal, and the refresh indication information is used to indicate to the upper-layer access device to send downlink data corresponding to the second terminal to the first AP; and
   when the first AP receives the downlink data that is sent by the upper-layer access device and that corresponds to the second terminal, caching, by the first AP, the downlink data corresponding to the second terminal.

2. The method according to claim 1, wherein operating channels of the first AP and the second AP are different, and after establishing, by the terminal, the association with the second AP, the method further comprises:
   when the terminal receives a switching notification sent by the first AP, and/or a duration in which the terminal receives the response frame reaches a target duration, changing, by the terminal, from the operating channel of the first AP to the operating channel of the second AP.

3. The method according to claim 2, wherein after changing, by the terminal, the operating channel from the operating channel of the first AP to the operating channel of the second AP, the method further comprises:
   sending, by the terminal, an activation message to the second AP on the operating channel of the second AP.

4. The method according to claim 1, wherein after sending, by the terminal to the first AP, the first action frame, the method further comprises:
   stopping, by the terminal, sending service data to the first AP.

5. The method according to claim 1, wherein before sending, by the terminal to the first AP, the first action frame, the method further comprises:
   sending, by the terminal, a fast transition request frame to the first AP, wherein a receiver address in the fast transition request frame is the address of the first AP, and the fast transition request frame further comprises the identifier of the second AP; and
   receiving, by the terminal, a fast transition response frame sent by the first AP.

6. A terminal, comprising a processor and a memory, wherein
   the memory is configured to store a computer program, and the computer program comprises a program instruction; and
   the processor is configured to invoke the computer program to implement the terminal roaming method according to claim 1.

7. A terminal roaming method, applied to a wireless local area network, wherein the method comprises:
   receiving, by a first access point (AP), a first action frame that is sent by a first terminal associated with the first AP and that is used to request to associate with a second AP, wherein a receiver address of the first action frame is an address of the first AP, and the first action frame further comprises an identifier of the second AP;
   sending, by the first AP, a first association request message obtained based on the first action frame, wherein the first association request message comprises an identifier of the first terminal; and
   sending, by the first AP, a response frame for the first action frame to the first terminal based on a result returned by the second AP for the first association request message, wherein the response frame comprises an association identifier allocated by the second AP to the terminal and the response frame is used to indicate whether an association succeeds;
   receiving, by the first AP, a second association request message sent by a third AP, wherein the second association request message comprises an identifier of a second terminal associated with the third AP, and the second association request message is obtained based on a second action frame that is sent by the second terminal to the third AP and that is used to request to associate with the first AP;
   sending, by the first AP, refresh indication information to an upper-layer access device, wherein the refresh indication information comprises the identifier of the second terminal, and the refresh indication information is used to indicate to the upper-layer access device to send downlink data corresponding to the second terminal to the first AP; and
   when the first AP receives the downlink data that is sent by the upper-layer access device and that corresponds to the second terminal, caching, by the first AP, the downlink data corresponding to the second terminal.

8. The method according to claim 7, wherein after sending, by the first AP, the response frame for the second action frame to the first terminal, the method further comprises:
   when no downlink data corresponding to the first terminal exists in the first AP, sending, by the first AP, a switching notification to the first terminal, wherein the switching notification is used to indicate to the first terminal to change an operating channel.

9. The method according to claim 7, wherein the method further comprises:
   receiving, by the first AP, a fast transition request frame sent by the first terminal, wherein a receiver address in the fast transition request frame is the address of the first AP, and the fast transition request frame further comprises the identifier of the second AP;
   sending, by the first AP, a fast transition message obtained based on the fast transition request frame to the second AP, wherein the fast transition message comprises the identifier of the first terminal; and sending, by the first AP, a fast transition response frame to the first terminal based on a result returned by the second AP for the fast transition message.

10. The method according to claim 7, wherein the method further comprises: when the first AP receives an activation message sent by the second terminal, sending, by the first AP, the downlink data corresponding to the second terminal to the second terminal.

11. An access point (AP), comprising a processor and a memory,
- wherein the memory is configured to store a computer program, and the computer program comprises a program instruction; and
- the processor is configured to invoke the computer program to implement the terminal roaming method according to claim 7.

\* \* \* \* \*

UNITED STATES PATENT AND TRADEMARK OFFICE
CERTIFICATE OF CORRECTION

| | |
|---|---|
| PATENT NO. | : 11,689,913 B2 |
| APPLICATION NO. | : 17/225645 |
| DATED | : June 27, 2023 |
| INVENTOR(S) | : Zhi Ma et al. |

It is certified that error appears in the above-identified patent and that said Letters Patent is hereby corrected as shown below:

In the Claims

In Column 25, Lines 7-8, In Claim 10, delete "to the second terminal to the second terminal." and insert -- to the second terminal. --.

Signed and Sealed this
Fifteenth Day of August, 2023

Katherine Kelly Vidal
*Director of the United States Patent and Trademark Office*